United States Patent [19]

Hoffman et al.

[11] Patent Number: 4,460,715

[45] Date of Patent: Jul. 17, 1984

[54] STABLE DISPERSIONS OF POLYMERS IN POLYFUNCTIONAL COMPOUNDS HAVING A PLURALITY OF ACTIVE HYDROGENS AND POLYURETHANES PRODUCED THEREFROM

[75] Inventors: Dwight K. Hoffman; Robert F. Harris; Nancy B. Tefertiller, all of Midland, Mich.; Randall C. Rains, Pittsburgh, Pa.

[73] Assignee: The Dow Chemical Company, Midland, Mich.

[21] Appl. No.: 320,160

[22] Filed: Nov. 10, 1981
(Under 37 CFR 1.47)

Related U.S. Application Data

[63] Continuation-in-part of Ser. No. 97,070, Nov. 23, 1979, Pat. No. 4,390,645.

[51] Int. Cl.$^3$ .............. C08G 18/14; C08G 18/30; C08G 18/63
[52] U.S. Cl. .................. 521/137; 524/764; 524/849; 524/850; 524/852; 524/851; 524/853; 252/182; 528/75
[58] Field of Search ............ 521/137; 528/75; 524/762, 849, 850, 852, 853, 851; 252/182

[56] References Cited

U.S. PATENT DOCUMENTS

| | | | |
|---|---|---|---|
| 3,304,273 | 2/1967 | Stamberger | 260/2.5 |
| 3,823,201 | 7/1974 | Pizzini et al. | 260/861 |
| 3,928,299 | 12/1975 | Rosenkrantz et al. | 260/85.5 N |
| 4,041,105 | 8/1977 | O'Shea et al. | 260/859 R |
| 4,049,636 | 9/1977 | Mao et al. | 260/77.5 CR |
| 4,108,954 | 8/1978 | Hieterhaus et al. | 264/216 |
| 4,111,865 | 9/1978 | Seefried et al. | 521/137 |
| 4,161,468 | 7/1979 | Davis et al. | 260/30.4 R |
| 4,166,889 | 9/1979 | Fujii et al. | 521/55 |
| 4,208,314 | 6/1980 | Priest et al. | 260/33.2 R |
| 4,226,756 | 10/1980 | Critchfield et al. | 260/33.2 R |

*Primary Examiner*—H. S. Cockeram

[57] ABSTRACT

A stable copolymer dispersion is prepared by addition copolymerization of (1) a monomeric adduct of an active hydrogen compound, e.g., a polyether polyol, and an acrylyl compound such as methacryloyl chloride with (2) ethylenically unsaturated monomer(s), e.g., styrene or a mixture thereof with acrylonitrile, while (1) and (2) are dispersed or dissolved in an excess of an active hydrogen polyfunctional compound such as a polyether polyol. The molar ratio of acrylyl moiety to active hydrogen compound is less than 0.1:1. The resulting dispersion has a controlled particle size and a viscosity such that it is suitably employed in the production of polyurethane foams.

11 Claims, No Drawings

STABLE DISPERSIONS OF POLYMERS IN POLYFUNCTIONAL COMPOUNDS HAVING A PLURALITY OF ACTIVE HYDROGENS AND POLYURETHANES PRODUCED THEREFROM

CROSS-REFERENCE TO RELATED APPLICATIONS

This application is a continuation-in-part of application Ser. No. 97,070, filed Nov. 23, 1979, now U.S. Pat. No. 4,390,645.

BACKGROUND OF THE INVENTION

The present invention relates to copolymer dispersions having excellent particle size distribution and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties, e.g., load bearing and processability, particularly foam applications, unacceptable for some applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In U.S. Pat. No. 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, more efficient control of particle size of the disperse phase is desired for many applications.

Accordingly, it is highly desirable to provide an improved, low viscosity copolymer dispersion wherein less unsaturated moiety is required in the polyahl in order to achieve the desired particle size and particle size distribution in the dispersion.

SUMMARY OF THE INVENTION

In one aspect, the present invention is such an unsaturated polyahl bearing as pendant groups at least about 0.001 and less than 0.1 mole of acryloyl and/or methacryloyl moiety per mole of the polyahl (hereinafter said unsaturated polyahl shall be called "acrylyl polyahl" and the term "acrylyl" will include both acryloyl and methacryloyl).

In another aspect, the present invention is a stable improved copolymer dispersion which comprises:
(A) a polyahl having dispersed therein;
(B) an addition copolymerizate of (1) monomeric adduct of (a) reactive acrylyl monomer (hereinafter called "reactive acrylyl") and (b) a polyahl with (2) at least one other ethylenically unsaturated monomer (hereinafter called "other monomer");
(C) a polymeric adduct of (1) an addition copolymer of a reactive acrylyl with at least one other ethylenically unsaturated monomer that is nonreactive with the reactive acrylyl and the polyahl and (2) a polyahl;
(D) a mixture of (B) and (C); or
(E) a mixture of (B) and/or (C) and a polymer of at least one other ethylenically unsaturated monomer; provided that in the copolymer dispersion, the mole ratio of polymerized acrylyl to polyahl is at least about 0.001:1 and is less than 0.1:1.

For the purposes of this invention, a "polyahl" is a polyfunctional compound wherein at least two of the functional groups are active hydrogen moieties capable of reacting with an isocyanate moiety to form a urethane or similar moiety. In addition, the terms "dispersed" or "dispersion" as used herein are generic to include dispersions wherein the disperse phase constitutes colloidal size particles as well as true solutions wherein the disperse phase is at the molecular level.

Surprisingly, the copolymer dispersions of the present invention exhibit excellent stability even at relatively low molar ratios of ethylenically unsaturated moieties to polyahl. Even more surprising is the excellent control over particle size and particle size distribution achieved in said dispersions.

This invention, in another aspect, is a method for making the aforementioned copolymer dispersion. In yet another aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed in the practice of this invention includes any organic compound having at least two active hydrogen moieties wherein the compound has a number average molecular weight ($M_n$) of at least 62. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Wohler in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group, as well as those which contain an amino group and a —SH group, may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included with the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4'-hydroxyphenyl)sulfone.

Other polyahls suitably employed include polylactones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides.

The acrylyl polyahl is a polyahl that bears at least about 0.001 and less than 0.1, preferably from about 0.01 to about 0.09, most preferably from about 0.02 to about 0.08, mole of acryloyl

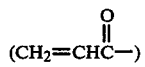

or methacryloyl

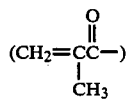

moiety per mole of polyahl. Typically, the molecules of the monomeric adduct of acrylyl compound and the polyahl which are dispersed or dissolved in polyahl to form the aorylyl polyahl have a polymer backbone similar to the polymer backbone of the polyahl and from 1 to 3, most preferably 1, pendant acryloyl or methacryloyl moieties. Where the polyahl is a polyol, the pendant moiety is one represented by the formula:

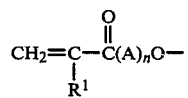

wherein $R^1$ is hydrogen or methyl, n is 0 or 1 and A is a suitable linking divalent moiety such as

wherein $R^2$ is alkylene. The more preferred monomeric adducts employed in the present invention are those represented by the formula:

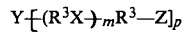

In this monomeric adduct as represented by the formula, each X is individually —O—, —S— or

wherein $R^4$ is hydrogen or alkyl, preferably X is —O—. Y is hydroxyl, oxyhydrocarbyl, oxycarbonylhydrocarbyl,

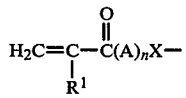

wherein A, $R^1$, X and n are as defined hereinbefore, or a residue of an active hydrogen initiator suitably employed in preparation of a polyether. Each Z is individually hydroxyl, oxyhydrocarbyl, oxycarbonylhydrocarbyl or

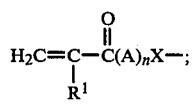

provided that at least on of Z and Y are

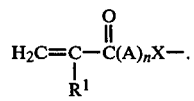

Each $R^3$ is individually alkylene, hydroxyalkylene, aminoalkylene, alkoxyalkylene, aryloxyalkylene, arylalkylene, hydroxyalkylalkylene, hydroxyarylalkylene, or haloalkylene; m is a whole number such that $-(R^3X-)_m-R^3-$ has a number average molecular weight ($M_n$) from about 100 to about 100,000, especially from about 250 to about 10,000; and p is a whole number from 1 to 10 provided that when Y is other than hydroxyl, p is at least 2. Most preferably, p is 2 or 3. For the purposes of this invention, hydrocarbyl is a monovalent hydrocarbon moiety such as aryl, alkyl, alkenyl and the like. Also, the terminology "each $R^3$ is individually" means that the $R^3$ groups in a particular polymer molecule may be the same or different. A corresponding interpretation applies to the terminologies "each Z is individually," "each X is individually," etc.

The most preferred monomeric adducts have polyalkyleneoxy backbones bearing only one pendant ethylenically unsaturated urethane group represented by the formula:

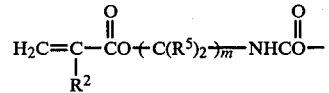

wherein $R^1$ is as defined before; each $R^5$ is individually hydrogen, alkyl or a comparable inert substituent; and m is a whole number preferably 1 to 6, more preferably 2 to 4, and most preferably 2. Somewhat less preferred are monomeric adducts having polyalkyleneoxy backbones bearing at least one pendant ethylenically unsaturated ester (acrylyl) group represented by the formula:

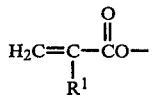

wherein R[1] is as defined before.

The acrylyl polyahl is most advantageously prepared by reacting a reactive acryloyl monomer with a polyahl under conditions sufficient to cause the reactive moiety of the monomer to react with an active hydrogen group of the polyahl. By reactive moiety is meant a moiety that reacts with an active hydrogen moiety such as a carboxylic acid chloride or an isocyanate.

Advantageously, when the polyahl is a polyol and the reactive moiety is an isocyanate, the reaction is carried out in the presence of a urethane catalyst such as amine or an organometallic catalyst, preferably an organometallic catalyst such as stannous octoate, lead octoate, stannous acetate, dibutyltin dilaurate and tin and zinc thiolates. The conditions employed in carrying out the urethane reaction involve maintaining the reaction mixture of the polyahl and isocyanate monomer, preferably neat, or alternatively dissolved in a non-reactive solvent such as ethyl acetate, toluene or cellosolve acetate at a temperature from ambient to 140° C. in a vessel for a reaction time from a few seconds to about 24 hours. Also suitably employed are reactive solvents such as polyahl or other ethylenically unsaturated monomers. The equivalent ratio of isocyanate monomer to active hydrogen of the polyahl is less than one. In the more preferred embodiments, very low NCO:active equivalent hydrogen ratios are employed, e.g., less than 0.2:1, most preferably 0.1:1 to 0.001:1.

Alternatively, when the polyahl is a polyol and the reactive moiety is a carboxylic acid chloride, the reaction to form the acrylyl polyahl is carried out by contacting polyol with acrylyl chloride using acid or base catalysis. If a solvent has been used in the reaction, it can be removed, or the composition containing the solvent can be employed as is. Also, the acrylyl polyahl can be blended with additional polyahl.

The polymeric adduct of (1) addition copolymer of reactive acrylyl monomer with at least one other ethylenically unsaturated monomer and (2) a polyahl is beneficially prepared by first copolymerizing the reactive acrylyl monomer with other monomer(s) by polymerization techniques described hereinafter and then reacting the resulting copolymer with polyahl using the procedures and conditions described hereinbefore to react the reactive acrylyl monomer with the polyahl.

The mixture of polymeric adduct and copolymerizate of acrylyl polyahl and other monomer(s) is readily prepared by physically mixing the components neat or dispersed in polyahl. Alternatively, this mixture can be prepared by subjecting a mixture of polyahl, reactive acrylyl monomer and other monomer(s) to conditions sufficient to cause copolymerization and reaction between the reactive acrylyl and the polyahl. The polyahl dispersion containing a mixture of the polymeric adduct and/or the copolymerizate with a polymer(s) of other monomer(s) is advantageously made by forming a dispersion of polymeric adduct and/or copolymerizate in polyahl by one of the foregoing methods and then adding other monomer(s) and subjecting the resulting formulation to polymerization conditions. It is found that the polymeric adduct and/or copolymerizate stabilize the resulting dispersion of polymer much in the same manner as the stabilizer described in U.S. Pat. No. 4,148,840 does.

For the purposes of this invention, the term "reactive acrylyl monomer" means a monomer having a reactive moiety as defined hereinbefore and an acryloyl or methacryloyl moiety. Exemplary reactive moieties include isocyanate (—NCO), and isothiocyanate (—NCS), carboxylic acid halide (—COX), wherein X is halo (e.g., chloro or bromo), with isocyanate being most preferred. Representative reactive acrylyl monomers are the isocyanatoalkyl esters of α,β-ethylenically unsaturated carboxylic acids, such as 2-isocyanatoethyl methacrylate, 2-isocyanatoethyl acrylate, 3-isocyanatopropyl methacrylate, 1-methyl-2-isocyanatoethyl methacrylate and 1,1-dimethyl-2-isocyanatoethyl acrylate; α,β-ethylenically unsaturated carboxylic acid halide such as acryloyl chloride and methacryloyl chloride; and the like. Suitable methods of preparing said isocyanatoesters are well-known, e.g., as shown in U.S. Pat. Nos. 2,718,516 and 2,821,544 and British Pat. No. 1,252,099. The carboxylic acid halides are readily prepared by the reaction of the corresponding carboxylic acid with a high boiling acid chloride such as benzoyl chloride.

Suitable ethylenically unsaturated monomers (so-called other monomers or other ethylenically unsaturated monomers), which are copolymerized to form copolymers with the monomeric adduct and/or the reactive acrylyl monomer, include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene and ar-bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned monomeric adduct or reactive acrylyl monomer, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of other ethylenically unsaturated monomer(s) employed in the copolymerization reaction is generally an amount sufficient to provide good reinforcement in urethane polymers and cell opening in urethane foams. Preferably, the amount of other unsaturated monomer(s) is from about 1 to about 70, more preferably from about 5 to about 50, most preferably from about 10 to about 40, weight percent based on the weight of the copolymer dispersion. The amount of the acrylyl polyahl employed in the copolymerization reaction is an amount sufficient to produce a stable dispersion and provide particle size control. Preferably, the amount of the acrylyl monomeric adduct employed is in the range from about 0.01 to about 50, more preferably from about 0.05 to about 25, most preferably from about 0.1 to about 15, weight percent based on the weight of the copolymer dispersion.

The copolymerization is readily carried out by simultaneously adding at a steady or constant rate a monomer(s) and a free radical catalyst to the acrylyl polyahl or a mixture of the acrylyl polyahl and the polyahl under conditions sufficient to cause free radical addition polymerization. The temperature of the copolymerization is dependent upon the initiator and is preferably in the range from about 25° to about 190° C., most preferably from about 110° to about 130° C, when azo-type catalysts are used. Alternatively, the free radical catalyst may be dispersed in a portion of the polyahl and thereafter added along with monomer to the acrylyl polyahl. Other polymerization processes, both continuous and batch, may be suitably employed.

Suitably, the concentration of polymerization catalyst is any amount sufficient to cause copolymerization of the monomeric adduct and the ethylenically unsaturated monomer(s). Preferably, however, the concentration of catalyst is in the range from about 0.1 to about 20, more preferably from about 0.5 to about 5, weight percent based on the weight of the other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, and t-butyl hydroperoxide. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate. azobis(isobutyronitrile) as well as mixtures of such catalysts. Of the foregoing catalysts, azobis(isobutyronitrile) and peroxy esters such as t-butyl peroctoate and t-butyl perbenzoate are preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

The resulting copolymer dispersion is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternately, the components may be reacted in a single working step commonly known as the "one-shot" technique of preparing polyurethanes.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water, such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the copolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

Into a 3-liter, 3-neck round-bottom flask equipped with addition funnel, stirrer, condenser, thermocouple and nitrogen sparge is charged 1499.4 g (0.31 mole) of a glycerine initiated polyalkylene polyol made from propylene oxide and ethylene oxide and having a weight average molecular weight of 4800 (Polyol I), 800 ml of methylene chloride and 0.3 g of phenothiazine. These ingredients are stirred and heated to 55° C. at which time 7.83 g of pyridine is added. Then, with stirring and refluxing, 8.46 g (0.081 mole) of methacryloyl chloride in ~100 ml of methylene chloride is added to the flask over a two-hour period after which time refluxing is continued for another 20 hours. The methylene chloride is then removed by distillation, the residual product is cooled to room temperature, and 800 ml of diethyl ether is added. The resulting salt precipitate is removed by filtration and the ether is removed by vacuum distillation to produce an initial methacryloyl polyol having 0.18 mole of methacryloyl moiety per mole of polyol (herein called Methacryloyl Polyol I). An additional 528 g (0.11 mole) of Polyol I is added with stirring to 132 g (0.0275 mole) of the aforementioned methacryloyl polyol and heated to 115° C. to yield a homogeneous methacryloyl polyol having 0.036 mole of methacryloyl per mole of polyol (herein called Methacryloyl Polyol II).

To 660 g (0.14 mole) of this heated Methacryloyl Polyol II is added 300 g of styrene, 6.2 g of azobisisobutyronitrile (AZO), 255 g (0.0531 mole) of Polyol I and 85 g (0.0177 mole) of Methacryloyl Polyol I over a period of 105 minutes. The resulting polymerization recipe containing a methacryloyl polyol having 0.04 mole of methacryloyl moiety per mole of polyol is heated with stirring to 115° C. for an additional 105 minutes and subjected to reduced pressure (<1 mm Hg) for 2 hours to yield a stable copolymer/polyol dispersion having a Brookfield viscosity (RVT viscometer, spindle No. 3, 10 rpm at 25° C.) of 2730 cps.

For purposes of comparison, the foregoing procedure is followed except that no methacryloyl chloride is added at any point during the process. Upon subjecting this reaction mixture to polymerization conditions, a very poor dispersion is formed containing relatively large chunks (>1 mm) of polystyrene. During the later stages of the reaction, the reaction mixture becomes so viscous that the stirrer can no longer operate. The resulting reaction mass exhibits poor fluidity and cannot be classified as a stable dispersion.

EXAMPLE 2

Following the procedure of Example 1, except that the styrene/acrylonitrile weight ratio (S/VCN) and the mole ratio of methacryloyl to polyol are varied as indicated in Table I, several polyol dispersions are prepared and tested for viscosity and particle size. The results of these tests are recorded in Table I.

TABLE 1

| Sample No. | S/VCN Weight Ratio | Mole of Methacryloyl per Mole of Polyol, Final Ratio | Viscosity[1], cps | Particle Size[2], μm |
|---|---|---|---|---|
| A$_1$* | 100/0 | 0.12 | >8,000,000 | ND |
| 1 | 100/0 | 0.04 | 2,730 | ND |
| A$_2$* | 75/25 | 0.2[3] | >8,000,000 | 0.42 |
| A$_3$* | 75/25 | 0.12 | 5,080 | 0.10 |
| 2 | 75/25 | 0.04 | 3,420 | 0.16 |
| 3 | 75/25 | 0.016 | 3,460 | 0.45 |
| A$_4$* | 50/50 | 0.12 | 4,670 | 0.15 |
| 4 | 50/50 | 0.04 | 3,210 | 0.14 |
| 5 | 50/50 | 0.016 | 2,750 | 0.27 |

*Not an example of this invention.
[1]Brookfield viscosity in centipoise using a RVT viscometer at 25° C. wherein spindle No. 3 and rpm 10 are employed.
[2]Volume median particle diameter in micrometers as measured by hydrodynamic chromatography described by H. Small in "Measure Particle Size by Hydrodynamic Chromatography," Chemtech, Vol. 7, page 196 (1977). ND means not determined.
[3]Concentration of initial methacryloyl polyol (1 mole of methacryloyl per mole of polyol) diluted to 0.2 mole methyloyl per mole of polyol.

EXAMPLE 3

Into a 2-liter, 3-neck, round-bottom reaction flask equipped with an addition funnel, stirrer, condenser thermocouple and nitrogen sparge is charged 1200 g of Polyol I (0.25 mole) and 1 g of dibutyltin dilaurate. These ingredients are stirred and heated to 120° C. until homogeneous. Then a 0.9204-g portion (0.009 mole) of methacryloyl chloride is added in one shot. The resulting mixture is stirred for 2 hours at 120° C. to form a final methacryloyl polyol having 0.036 mole of methacryloyl per mole of polyol. A monomer stream of 225 g of styrene (S), 75 g of acrylonitrile (VCN) and 6 g of AZO is added with stirring to the heated mixture over a 2-hour period. This mixture is heated at 120° C. with stirring for an additional hour and subjected to reduced pressure (<1 mm Hg) for an hour to yield a stable copolymer polyol dispersion having a Brookfield viscosity (RVT viscometer, spindle No. 3, rpm of 10 at 25° C.) of 3800 cps.

EXAMPLE 4

Into a 3-liter, 3-neck, round-bottom reaction vessel equipped with an addition funnel, stirrer and condenser is added 4 g of 2,6-di(t-butyl)phenol, 2075 g (0.43 mole) of Polyol I and 26 g of dibutyltin dilaurate. These ingredients are mixed and heated to 90° C. A 9.7-g portion (0.093 mole) of methacryloyl chloride is then added in one shot and the mixture is stirred for 26 hours and subjected to a reduced pressure of <1 mm Hg at 90° C. for 3 hours to produce an initial methacryloyl polyol having ~0.2 mole of methacryloyl moiety per mole of polyol (Methacryloyl Polyol III).

A 528-g portion (0.11 mole) of Polyol I and 132 g of the Methacryloyl Polyol III is charged into a 2-liter, 3-neck, round-bottom reaction vessel equipped with a thermocouple, funnel, stirrer, condenser, a thermonipple and nitrogen sparge. The resulting mixture is stirred and heated to 115° C. to yield a methacryloyl polyol having ~0.04 mole of methacryloyl moiety per mole of polyol (Methacryloyl Polyol IV). A solution of 6.2 g of AZO, 75 g of S, 225 g of VCN, 255 g (0.053 mole) of Polyol I and 83 g (0.017 mole) of Methacryloyl Polyol III is added to the reaction vessel over a 2-hour period at 120° C. After an additional hour at 120° C., volatiles are removed from the product under vacuum for 40 minutes to yield a copolymer dispersion having 0.04 mole of polymerized methacryloyl moiety per mole of polyol. The resulting stable yellow copolymer dispersion (Sample No. 1) has a polymer solids of 20 percent and a Brookfield viscosity as reported in Table II.

Following the foregoing procedure, except that the S/VCN weight ratio is varied, several copolymer polyols are prepared and tested for viscosity. The viscosities of the samples (Sample Nos. 2–5) are recorded in Table II.

TABLE II

| Sample No. | S/VCN Weight Ratio | Viscosity[1], cps | Particle Size[2], μm |
|---|---|---|---|
| 1 | 25/75 | 3310 | 0.16 |
| 2 | 33/67 | 3106 | 0.19 |
| 3 | 50/50 | 3156 | 0.21 |
| 4 | 67/33 | 3500 | ~0.55 |
| 5 | 75/25 | 6366 | ~0.75 |

[1]Same as (1) in Table I.
[2]Same as (2) in Table I.

As evidenced by the data of Table II, the viscosities of the dispersions increase as the S/VCN weight ratio increases.

EXAMPLE 5

Following the procedure of Example 4, using a S/VCN mole ratio of 50:50 and initial methacryloyl polyols having initial methacryloyl/polyol mole ratios (Initial M:P Ratio) from 0.2:1 to 1:1, three copolymer polyols are prepared and tested for viscosity and particle size. In all samples, the initial methacryloyl polyol is diluted with futher Polyol I to yield a final methacryloyl polyol having 0.04 mole of methacryloyl per mole of polyol. The results are reported in Table III.

TABLE III

| Sample No. | Initial M:P Ratio[1], mole | Viscosity[2], cps | Particle Size, μm[4] |
|---|---|---|---|
| 1 | 0.2:1 | 3156 | 0.29 |
| 2 | 1:1 | 3150 | 0.23 |
| 3 | 3:1 | 4260 | ~0.58 |

[1]Moles of methacryloyl in mole of the methacryloyl polyol prior to dilution with further polyol.
[2]Same as (1) in Table I.
[3]Same as (2) in Table II.

As evidenced by the data in Table III, the mole ratio of methacryloyl to polyol in the initial methacryloyl polyol prior to dilution is advantageously from about 0.2:1 to about 1:1 in order to obtain a small particle size.

EXAMPLE 6

Following the procedure of Example 4, using a S/VCN mole ratio of 50:50 and polyols having different types of unsaturation, several copolymer dispersions are prepared and tested for viscosity and particle size. The results are reported in Table IV.

For purposes of comparison, one dispersion is prepared wherein no unsaturation is added to the polyol.

TABLE IV

| Sample No. | Unsaturation[1] Type | Amount mole/mole | Viscosity[2], cps | Particle size[3] μm |
|---|---|---|---|---|
| 1 | MAC | 0.04 | 3150 | 0.29 |
| 2 | AC | 0.04 | 3160 | 0.26 |
| C₁* | None | 0 | 2400 | ~0.9 |
| A* | MAH | 0.04 | 2750 | 0.50 |
| 3 | IEM | 0.04 | 3290 | 0.10 |

*Not an example of the invention.
[1]Mole of unsaturation per mole of polyol after dilution.
MAC — Polyol I having 0.04 mole of methacryloyl per mole of Polyol I resulting from the reaction of Polyol I with methacryloyl chloride (MAC).
AC — Similar to above with acryloyl chloride.
MAH — Similar to above with maleic anhydride.
IEM — Similar to above with 2-isocyanatoethyl methacrylate.
[2]Same as (1) in Table I.
[3]Same as (2) in Table I.

As evidenced by the data of Table IV, the acryloyl or methacrylol moiety that is characteristic of MAC, AC and IEM is more efficient in producing a small particle size dispersion than is maleic anhydride.

EXAMPLE 7

Into the reaction vessel used in Example 1 is added 0.4 g of 2,6-di(t-butyl)phenol, 202.9 g (0.041 mole) of Polyol I and 1.9 g of dibutyltin dilaurate. The resulting mixture is stirred at 70° C. until homogeneous at which time 0.74 g (0.008 mole) of acryloyl chloride is added in one shot. The mixture is stirred at 70° C. for 22 hours and subjected to reduced pressure (<1 mm Hg) to remove volatiles. The product recovered is a pale yellow, clear liquid polyol having 0.2 mole of pendant acryloyl moiety per mole of polyol (hereinafter called "Initial Acryloyl Polyol").

Into the 2-liter flask used in Example 3 is added 528 g (0.11 mole) of Polyol I and 132 g (0.028 mole) of Initial Acryloyl Polyol. The resulting mixture is heated with stirring to 115° C. A mixture of 150 g of S, 150 g of VCN, 6.2 g of AZO, 255 g (0.053 mole) of Polyol I and 63 g (0.013 mole) of Initial Acryloyl Polyol are added with stirring to the reaction vessel over a 2-hour period. In this mixture, the final acryloyl:polyol mole ratio is 0.04:1. The resulting mixture was heated for an additional 1½ hours and the product is then subjected to reduced pressure (<1 mm Hg) to remove volatiles. A copolymer dispersion having a polymer solids of 20 percent and a Brookfield viscosity (RVT viscometer, spindle No. 3, 10 rpm at 25° C.) of 3160 cps is recovered.

Seventy grams of this copolymer dispersion, 130 g of Polyol I, 6.6 g of water, 0.2 g of amine catalyst (Niax A-1 sold by Union Carbide), 1.12 g of another amine catalyst (Dabco 33 LV sold by Air Products), 0.3 g of diethanol amine, 1.4 g of a silicone surfactant (L-5303 sold by Union Carbide), 0.08 g of another silicone surfactant (DCF-1-1630 sold by Dow Corning), 0.01 g of a tin catalyst (UL-1 sold by Witco) are blended together for 30 seconds at room temperature. To this mixture is added a mixture of 68 g of toluene diisocyanate and 17 g of methylene diphenylisocyanate and stirred for 10 seconds. The mixture is poured into a bucket and rises in 70 seconds. The resultant foam is placed into a 250° F. oven for 8 minutes, crushed and heated for an additional 15 minutes to produce a cured flexible foam.

EXAMPLE 8

Into a 1-liter, three-neck, round-bottom flask equipped with a condenser, addition funnel and magnetic stirrer are added 0.4 g of phenothiazine, 200 g (0.04 mole) of Polyol I, 0.91 g of triethylamine and 400 ml of methylene chloride. The ingredients are stirred and heated to reflux temperature at which time 0.94 g (0.009 mole) of methacryloyl chloride diluted in 25 ml of methylene chloride is added with stirring to the flask over a period of 10 minutes. The reaction mixture is maintained at reflux temperature for an additional hour. The reaction mixture is then cooled and subjected to reduced pressure to remove volatiles. To the remaining reaction mixture is added a 400-ml portion of triethylamine hydrochloride. The salt is removed by filtration and the ether is removed by vacuum distillation to produce an initial methacryloyl polyol having 0.16 mole of methacrylol moiety per mole of polyol.

Following the procedure of Example 3, 82.5 g (0.172 mole) of this initial methacryloyl polyol and 247.5 g (0.052 mole) of Polyol I are charged to the reaction vessel. These ingredients are stirred and heated to 115° C. A mixture of 75 g of S, 75 g of VCN, 6.2 g of AZO, 117 g (0.024 mole) of Polyol I and 52 g (0.011 mole) of methacryloyl polyol is added with stirring to the reaction vessel over a 1-hour period. The final mole ratio of methacryloyl to polyol is 0.04:1. The temperature of the resulting mixture is then maintained at 115° C. for 1.25 hours and the mixture is subjected to reduced pressure (<1 mm Hg) to remove volatiles. The resulting product is a copolymer dispersion having a polymer solids of about 20 percent and a Brookfield viscosity of 3055 cps.

What is claimed is:

1. A stable copolymer dispersion which comprises:
   (A) a polyahl having dispersed therein;
   (B) an addition copolymerizate of (1) a monomeric adduct of (a) a polyahl and (b) reactive acrylyl monomer with (2) at least one other ethylenically unsaturated monomer; or
   (C) a polymeric adduct of (1) a polyahl and (2) an addition copolymer of a reactive acrylyl monomer with at least one other ethylenically unsaturated monomer which is nonreactive with the acrylyl monomer; or
   (D) a mixture of (B) and (C); or
   (E) a mixture of (B) and/or (C) and a polymer of at least one other ethylenically unsaturated monomer; provided that in the copolymer dispersion, the mole ratio of polymerized acrylyl to polyahl is at least 0.001:1 and less than 0.1:1.

2. A method for making the copolymer dispersion of claim 1 which method comprises:
   (A) reacting a reactive acrylyl monomer with a polyahl to form a monomeric adduct and
   (B) copolymerizing the adduct with another ethylenically unsaturated monomer or a mixture of at least two of such other monomers in a polyahl liquid medium which medium is a continuous phase provided that the mole ratio of acrylyl to polyahl is at least about 0.001:1 and less than 0.1:1.

3. A method for making the copolymer dispersion of claim 1 which method comprises:
   (A) copolymerizing a reactive acrylyl monomer with another ethylenically unsaturated monomer or a mixture of at least two of such other monomers and
   (B) reacting the resulting copolymer with a polyahl in excess polyahl to form a polymeric adduct of polyahl and copolymer dispersed in polyahl; provided that the mole ratio of polymerized acrylyl to polyahl is at least about 0.001:1 and less than 0.1:1.

4. The dispersion of claim 1 wherein the polyahl is a polyether polyol, the reactive acrylyl monomer is methacryloyl chloride or acryloyl chloride, and the other ethylenically unsaturated monomer or a mixture of at least two of such other monomers is a monovinylidene aromatic, an ethylenically unsaturated carboxylic acid, an ethylenically unsaturated nitrile, alkyl ester of an ethylenically unsaturated carboxylic acid, a vinyl halide, a vinylidene halide or a mixture of two or more thereof.

5. The dispersion of claim 4 wherein the polyahl is a polyalkylene polyether polyol, the acrylyl monomer is methacryloyl chloride and the other monomer is styrene, acrylonitrile or a mixture thereof.

6. The dispersion of claim 1 or 5 wherein the other monomer or mixture of such other monomers constitutes from about 1 to about 70 weight percent of the dispersion.

7. The dispersion of claim 1, 4 or 5 wherein the other monomer or mixture of such monomers constitutes from about 10 to about 40 weight percent of the dispersion.

8. An unsaturated polyahl bearing as pendant groups at least about 0.001 and less than 0.1 mole of acrylyl moiety per mole of polyahl.

9. The polyahl of claim 8 wherein the acrylyl moiety is methacryloyl.

10. A polyurethane prepared by reacting the copolymer dispersion of claim 1 with an organic polyisocyanate.

11. The polyurethane of claim 10 in the form of a foam.

* * * * *